United States Patent [19]

Linke

[11] 4,272,295

[45] Jun. 9, 1981

[54] STARCH-BASED ADHESIVES

[75] Inventor: Kaljo Linke, Sydney, Australia

[73] Assignee: N. B. Love Industries Pty. Ltd., New South Wales, Australia

[21] Appl. No.: 46,019

[22] Filed: Jun. 6, 1979

[30] Foreign Application Priority Data

Jun. 20, 1978 [AU] Australia .............................. PD4794

[51] Int. Cl.³ .......................... C08L 3/00; C08L 89/00
[52] U.S. Cl. ................................ 106/157; 106/197 C; 106/208; 106/213
[58] Field of Search ................. 106/208, 213, 197 C, 106/130, 157; 127/32; 156/336

[56] References Cited

U.S. PATENT DOCUMENTS

| | | | |
|---|---|---|---|
| 3,015,572 | 1/1962 | Casey et al. ......................... | 156/336 |
| 3,355,307 | 11/1967 | Schoenberger et al. ............ | 106/213 |
| 3,622,677 | 11/1971 | Short et al. .......................... | 127/32 |
| 3,944,428 | 3/1976 | Schoenberg et al. . | |

OTHER PUBLICATIONS

Journal of American Association of Cereal Chemists, vol. 50, pp. 271-281 by Miller et al.

*Primary Examiner*—Theodore Morris
*Attorney, Agent, or Firm*—Weingarten, Maxham & Schurgin

[57] ABSTRACT

This invention relates to a starch based adhesive comprising a lyophilic colloid, a partially gelatinized starch and water and to a process for manufacturing such adhesives comprising the steps of mixing a lyophilic colloid with a starch and water and then partially gelatinizing the starch. Preferred lyophilic colloids include carboxymethyl cellulose and fully gelatinized starch. An advantage of the adhesive is that properties of the adhesive may be conveniently controlled by control of the ratio of the components and the degree of partial gelatinization.

10 Claims, No Drawings

STARCH-BASED ADHESIVES

FIELD OF THE INVENTION

This invention relates to starch based adhesives, for example, for use in the manufacture of corrugated and laminated paper and board, and in particular to starch based adhesives requiring low heat-energy consumption for forming satisfactory bonds.

BACKGROUND OF THE INVENTION

Starch consists of microscopic granules which swell in hot water or in cold or warm caustic solution. The granules do not swell in cold water or in very dilute caustic solution. Onset of swelling commences if temperature is increased beyond a critical point or caustic addition exceeds a critical concentration. This process is known as gelatinisation. The changes in the starch granules during gelatinisation are observable and progressive. Initially, there is a slight swelling of the granules and a loss of birefringence. A gradual observable increase in viscosity follows accompanied by further granular swelling until a plateau is reached. Only after the plateau stage do the granules become fully swollen to their maximum size. If the swelling process is not arrested, the granules continue to swell until they burst. The viscosity increases sharply followed sequentially by the folding of the granules and the appearance of exudate. After the exudate appears, the starch is no longer granular in form but is a stringy mass at which stage the starch is said to be fully or completely gelatinised. If the swelling is arrested in the plateau prior to maximum swelling or bursting of the granules, the starch is said to be partially gelatinised.

Starch based adhesives have been used for the manufacture of corrugated boards since the early 1930's. Basically the preparation processes fall into two groups:

(a) The CARRIER SYSTEMS, where the bulk of the adhesive is raw starch (approximately 80-85%) and the desired viscosity of the adhesive is derived from a proportion (approximately 15-20%) of the total raw starch, this proportion acting as a carrier after being fully gelatinised through heating and/or through treatment with strong alkali solution. The balance of the adhesive remains non-gelatinised starch. Various other lyophilic colloids have been used in place of fully gelatinised starch as a carrier. The liquid phase of such adhesives consequently is relatively viscous.

(b) The NO-CARRIER or CARRIER-FREE SYSTEMS are described in Australian specifications Nos. 290,991, 425,716 and 432,257, where the desired viscosity of the adhesive is obtained by swelling the starch granules in the adhesive by gentle alkali and/or heat treatment so that all of the starch is partly gelatinised. The liquid phase of such adhesives is very thin as, according to the respective patents, a negligible proportion of starch is fully gelatinised, i.e. in the form of lyophilic colloid.

During the last few years there has been a change in the concept of producing corrugated boards. This probably has been brought about by rapidly escalating heat-energy costs and the looming shortage of oil.

The generally tightening economic conditions and the consequent demands for higher production rates has resulted in innovation both in application techniques and in equipment design.

The current requirement is for production of corrugated board with the minimum evaporation of water from the glue-lines. This would have advantages not only in terms of savings in heat-energy consumption, but also in terms of better warp-control of combined boards.

Adhesive application equipment has been improved to enable uniform metering of adhesive at very low film thicknesses and it is now possible to apply less than half of the film thicknesses commonly used. To complement the better application equipment, hot-plate sections have been shortened and more adequately temperature-controlled. However, existing starch-based adhesive systems do not satisfy all the requirements of a modern corrugating plant where application of low film thicknesses of adhesive is highly desirable.

The necessity for an adhesive not only to have the correct rheological properties but also the correct water holding capacity for an individual machine is becoming more and more important. It is therefore desirable to have an adhesive preparation system that allows these important properties to be conveniently varied to enable "tailor-making" adhesives not only for each individual plant, but also for the different units within a plant.

SUMMARY OF THE INVENTION

According to a first aspect the invention is a starch based adhesive comprising substantially a first portion having at least one lyophilic colloid, a second portion having at least one partially gelatinised starch, and a third portion of water.

According to a second aspect the invention is an intermediate for manufacture of a starch based adhesive comprising a blend of at least one lyophilic colloid and at least on raw starch, said blend being in a substantially dry state.

According to a third aspect the invention includes a method of manufacture of a starch based adhesive comprising the steps of:

1. combining as a mixture at least one lyophilic colloid, at least one raw starch, and water, and
2. partially gelatinising said raw starch.

PREFERRED EMBODIMENTS

Adhesives according to the invention, by using a two component system of lyophilic colloid and partially gelatinised starch, permit both the control of rheological properties and also the control of water holding properties.

The higher the ratio of lyophilic colloid to partially gelatinised starch the more the rheology of the adhesive is "long" and "stringy" in flow characteristics and the higher its water holding capacity. Conversely, the lower the ratio of lyophilic colloid to partially gelatinised starch, the more the rheology is "short" in flow characteristics and the lower the water holding characteristics.

The viscosity of the system may be controlled through the degree of partial gelatinisation of the swollen starch component as well as by varying the proportion of lyophilic colloids to partially gelatinised starch in the liquid phase of the adhesive.

Importantly, adhesives according to the invention permit convenient in-plant variation and control of such properties, each of the two components contributing different properties.

Thus the ratio of lyophilic colloid to partially gelatinised starch may be varied from 1 part by weight per 100 to 20 parts by weight per 100 depending on the exact rheological and water holding properties desired. However for most applications the ratio is from 3 to 12 parts by weight and more commonly from 4 to 8 parts by weight.

Water merely serves as a vehicle. If insufficient water is present it is difficult to obtain partial gelatinisation of the starch uniformly and if too much water is used, excessive heat energy must be consumed for its subsequent removal.

Thus the solids content of the water may be varied over a wide range to suit particular application machinery. Usually the solids content will be adjusted to be in the range 15–40% solids, and more usually will be in the range 20–30% although solids contents outside these ranges could be used.

Although any lyophilic colloid may be used, preferably the colloid is borax compatible.

Particularly suitable lyophilic colloids include fully gelatinised starch, carboxymethyl cellulose, alginates, Irish moss extracts, casein, other proteins such as wheat and soy protein, and salts of these substances.

Mixtures of the above mentioned lyophilic colloids may be used as the lyophilic colloid component to adjust water holding capacity of the final adhesive according to individual plant requirements.

For example, if fully gelatinised starch is used as the lyophilic colloid it does not normally provide sufficient water holding capacity for low film thickness applications. Consequently, for such applications a mixture of fully gelatinised starch with other lyophilic colloids having better water holding capacity is preferable.

Examples of starch which may be used either as fully gelatinised starch in the lyophilic colloid portion or as partly gelatinised starch include wheat starch, corn starch and tapioca starch.

In manufacture of the adhesive the lyophilic colloid is mixed with raw starch in water and heated under alkaline conditions so as to partially gelatinise the raw starch.

Any water soluble alkaline substance will be effective for swelling the raw starch granules and caustic soda solution is usually used. The concentrations and temperatures to achieve controlled partial gelatinisation are well known to those skilled in the art. The gelatinisation reaction may be arrested at any point prior to complete gelatinisation by use of one or more reaction stoppers; acids or acid salts or buffering agents or a mixture of these. For example, borax, boric acid, aluminum sulphate or sodium silicate may be used as well as mineral acids. Of these sodium silicate is preferred since it also serves as a retarder in gelatinisation of the adhesive under application conditions.

The process may be carried out in any one of a number of ways.

According to a preferred embodiment alkali solution is combined with a lyophilic colloid in one tank and a starch slurry consisting of raw starch granules suspended in water is prepared in a separate mixing tank.

The colloid is added to the raw starch slurry whilst mixing. The mixture is then heated, preferably with live steam, until desired viscosity is achieved. The reaction stopper is then added, and optionally, waterproofing or other similar finishing agents may be added.

According to other embodiments, the alkaline substance may be added in whole or in part to the raw starch slurry prior to addition thereto of the colloid, or may be added to water prior to addition thereto of the colloid and of the raw starch, or may added subsequently to the mixing of the raw starch and the colloid in water.

Similarly the raw starch slurry may be added to the colloid or both the colloid and the raw starch may be added to water.

As will also be apparent, any of the components may be preheated prior to addition of the others or heat may be applied subsequent to mixing.

However, in the event that the colloid is added to water and then raw starch is added, a very efficient mixer is required since it is difficult to slurry raw starch in thickened water.

According to yet another embodiment an intermediate comprising a dry mixture of colloid and raw starch may be prepared which can subsequently be added to water followed by partial gelatinisation of the raw starch by heating under alkaline conditions. The intermediate may also be pre-slurried in water and may contain an alkaline substance and finishing agents such as waterproofing agents.

In still another embodiment, an intermediate comprising a dry mixture of lyophilic colloid and raw starch may be added to water followed by partial gelatinisation of the raw starch by heating the mixture and subsequently cooling it to arrest the gelatinisation process.

The procedures can be automated by using simple level, temperature and viscosity controllers.

Two examples of embodiments according to the invention are given below.

EXAMPLE 1

1. 25 Kg. of a lyophilic colloid consisting of 90% by weight fully gelatinised starch and 10% by weight of carboxymethyl cellulose was dispersed in 220 liters of warm water (approximately 50° C.) and 13 Kg. of 46% caustic soda solution was added. The mix was stirred approximately 10 minutes in a conventional carrier tank.

2. 400 Kg. of commercial wheat starch was slurried in 900 liters of water in a starch mixing tank.

3. The Colloid "solution" was pumped into the starch mixing tank.

4. The mixture was heated with live steam until viscosity increased to 28 seconds (STEIN HALL CUP).

5. Immediately, 2½ Kg. of Boric Acid was added and after 1 minute mixing 1 liter of sodium silicate (40°Be, 3.2:1 ratio) was added. The mix was tried on double-backer glue-stations for making double-wall board. Speeds varying from 120–140 m/min were achieved without edge delamination.

EXAMPLE 2

1. 25 kg. of a lyophilic colloid consisting of 96% by weight of fully gelatinised starch and 4% by weight of wheat protein was dispersed in approximately 250 liters of warm water, 8 liters of 46% caustic soda solution was added. The mix was stirred approximately 10 minutes.

2. The level in the mixer was brought up to 1150 liter mark with normal tap-water.

3. 400 Kg. of commercial wheat starch was added and dispersed in the liquid phase.

4. 4.5 liters of 46% caustic soda was diluted with 15 liters of water and added to the mixture over a period of approximately 5 minutes.

5. The mixture was then heated with live steam until viscosity increased to 30 seconds (STEIN HALL CUP).

6. Immediately 2.75 Kg. of Boric Acid and 0.75 liters of Sodium Silicate was added.

The mix was used on double-backer glue-stations for producing heavy-weight board at 150 m/min. on a 8-hot-plate machine with 50 p.s.i. steam pressure in the hot-plate section. Glue-gap clearance at the glue-station was 0.1 mm (0.004").

I claim:

1. The method of manufacturing a starch based adhesive comprising the steps of:
   combining as a mixture at least one lyophilic colloid, granules of at least one raw starch, a water soluble alkaline substance, and water;
   partially gelatinising the raw starch granules by alkalization until the starch granules are partially swollen, have lost birefringence, and have increased viscosity, but have not attained maximum swelling and have not burst; and
   adding a reaction stopper to the mixture prior to the raw starch granules reaching maximum swelling and bursting.

2. A method of manufacturing a starch based adhesive comprising the steps of:
   combining as a mixture at least one lyophilic colloid, granules of at least one raw starch, and water; and
   partially gelatinising the raw starch granules using heat and cold in sequence until the raw starch granules are partially swollen, have lost birefringence, and have increased viscosity, but have not attained maximum swelling and have not burst.

3. A method of manufacturing a starch based adhesive comprising the steps of:
   combining as a mixture at least one lyophilic colloid, granules of at least one raw starch, a water soluble alkaline substance, and water;
   heating and mixture;
   partially gelatinising said raw starch granules by heat and alkalization until said granules are partially swollen, have lost birefringence, and have increased viscosity, but have not attained maximum swelling and have not burst;
   adding a reaction stopper to said mixture prior to said starch granules reaching maximum swelling or bursting; and
   cooling said mixture.

4. The method of manufacturing a starch based adhesive as recited in claim 1, 2 or 3 wherein said combining step employs at least one lyophilic colloid selected from the group consisting of carboxymethyl cellulose, alginates, Irish Moss extracts, proteins and the respective salts of any of these colloids.

5. The method of manufacturing a starch based adhesive as recited in claim 1, 2 or 3 wherein said combining step employs fully gelatinised starch as the lyophilic colloid.

6. The method of manufacturing a starch based adhesive as recited in claim 5 wherein said fully gelatinised starch is selected from the group consisting of fully gelatinised wheat starch, fully gelatinised corn starch, and fully gelatinised tapioca starch.

7. The method of manufacturing a starch base adhesive as recited in claim 1, 2 or 3 wherein said combining step employs a ratio of lyophilic colloid to raw starch granules in the range of 1 to 20 parts colloid to 100 parts raw starch by weight.

8. The method of manufacturing a starch based adhesive as recited in claim 1, 2 or 3 wherein said combining step employs a ratio of lyophilic colloid to raw starch granules in the range of 3 to 12 parts colloid to 100 parts raw starch by dry weight.

9. The method of manufacturing a starch based adhesive as recited in claim 1, 2 or 3 wherein said combining step employs raw starch granules selected from the group consisting of raw wheat starch, raw corn starch, and raw tapioca starch.

10. The method of manufacturing a starch based adhesive as recited in claim 1, 2 or 3 further comprising adding water-proofing agents and finishing agents.

* * * * *